(12) United States Patent
Teo et al.

(10) Patent No.: US 8,295,261 B2
(45) Date of Patent: Oct. 23, 2012

(54) METHOD FOR DETECTING HIDDEN NODES IN COGNITIVE RADIO NETWORKS

(75) Inventors: Koon Hoo Teo, Lexington, MA (US); Ehsan Azarnasab, Salt Lake City, UT (US); Rong-Rong Chen, Sandy, UT (US); Behrouz Fahang, Salt Lake City, UT (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 695 days.

(21) Appl. No.: 12/394,748

(22) Filed: Feb. 27, 2009

(65) Prior Publication Data
US 2010/0220707 A1    Sep. 2, 2010

(51) Int. Cl.
*H04J 1/00* (2006.01)
*H04B 7/00* (2006.01)
(52) U.S. Cl. .......................... 370/343; 370/310
(58) Field of Classification Search .................. 370/445, 370/447, 448, 450, 458, 461, 462
See application file for complete search history.

(56) References Cited

U.S. PATENT DOCUMENTS

| | | | | |
|---|---|---|---|---|
| 2009/0149208 A1* | 6/2009 | Huttunen et al. | ............. | 455/509 |
| 2009/0207735 A1* | 8/2009 | Ben Letaief et al. | ......... | 370/237 |
| 2009/0247201 A1* | 10/2009 | Ye et al. | ............. | 455/509 |
| 2009/0252178 A1* | 10/2009 | Huttunen et al. | ............. | 370/445 |
| 2010/0062718 A1* | 3/2010 | Zhou et al. | ................. | 455/67.11 |
| 2010/0279725 A1* | 11/2010 | Muraoka et al. | ............. | 455/509 |

OTHER PUBLICATIONS

Weiss et al., "Efficient Signaling of Spectral Resources in Spectrum Pooling Systems," Proceedings of the 10th Symposium on Communications and Vehicular Technology (SCVT), Nov. 2003.
Han, et al., "A Spectrum Exchange Mechanism in Cognitive Radio Contexts," IEEE 17th International Symposium on Personal, Indoor and Mobile Radio Communications, pp. 1-5, Sep. 2006.
Visotsky et al., "On Collaborative Detection of TV Transmissions in Support of Dynamic Spectrum Sharing," First IEEE International Symposium on New Frontiers in Dynamic Spectrum Access Networks (DySPAN), pp. 338-345, Nov. 2005.
Su et al., "Cognitive Radio Based Multi-Channel MAC Protocols for Wireless Ad Hoc Networks," IEEE Global Telecommunications Conference (GLOBECOM), pp. 4857-4861, Nov. 2007.
Azarnasab et al., "Filterbank Multicarrier and Multicarrier CDMA for Cognitive Radio Systems," IEEE CrownCom, Aug. 2007.
Cabric et al., "Implementation Issues in Spectrum Sensing for Cognitive Radios," Conference Record of the Thirty-Eighth Asilomar Conference on Signals, Systems and Computers, vol. 1, pp. 772-776, Nov. 2004.
Mishra et al., "Cooperative Sensing Among Cognitive Radios," IEEE International Conference on Communications (ICC), vol. 4, pp. 1658-1663, Jun. 2006.
Cabric et al., "A Cognitive Radio Approach for Usage of Virtual Unlicensed Spectrum," 14th IST Mobile and Wireless Communications Summit, Jun. 2005.
Anouar et al., "Optimal Constant-Window Backoff Scheme for IEEE 802.11 DCF in Finite Load Single-Hop Wireless Networks," pp. 277-281, 2006.

* cited by examiner

*Primary Examiner* — Ian N Moore
*Assistant Examiner* — Afshawn Towfighi
(74) *Attorney, Agent, or Firm* — Dirk Brinkman; Gene Vinokur

(57) ABSTRACT

The invention and method provides a concise model for signaling over control channel of cognitive radio. The model is analyzed and simulated for optimum parameters of wireless network. The optimized network parameters facilitate improvement of channel usage for cognitive wireless network leading to bandwidth efficiency.

10 Claims, 3 Drawing Sheets

METHOD FOR DETECTING HIDDEN NODES IN COGNITIVE RADIO NETWORKS

FIELD OF THE INVENTION

This invention relates generally to wireless networks, and more particularly to detecting hidden nodes in cognitive radio networks.

BACKGROUND OF THE INVENTION

Cognitive Radio Network

In cognitive radio networks, nodes (transceivers) adapt transmission and reception parameters to communicate efficiently, while avoiding interference with other nodes. The adaptation is based on an active sensing of external and internal radio environments, such as radio frequency (RF) spectrum, and node and network states.

Hidden Nodes

A typical cognitive radio (CR) network includes primary nodes (PNs) and secondary nodes (SNs) that share a broadband RF spectrum. Typically, only the PNs are licensed, and priority access to the RF spectrum. The SNs attempt to aggregate available bandwidth while minimizing interference with or by the PNs nodes.

One problem in CR networks relates to hidden nodes (HNs), which are detectable by some but not all nodes. This leads to difficulties in media access control (MAC). The HN problem needs to be resolved to minimize interference. For this purpose, the SNs should collaboratively sense the spectrum and decide which part of the spectrum is available.

Hidden Node Detection

Conventional collaborative sensing generally involves signaling via a narrow band dedicated control channel (DCC). To solve the hidden node HN problem, one method uses a boosting protocol where nodes in the network broadcast strong signals on frequency bands where the nodes detect PN signals, thus reducing the need for the DCC, Weiss et al., "Efficient Signaling of Spectral Resources in Spectrum Pooling Systems," Proceedings of the 10th Symposium on Communications and Vehicular Technology (SCVT), November 2003. If the boosting is for a short period of time and only for newly allocated bands, then the boosting incurs insignificant and acceptable interference to the PNs. However, the boosting can violate non-interference requirements of the network and increase overhead to achieve a desired reliability.

Another method uses a transform domain communication network, and a conventional contention scheme for access signaling of a network with a base station, Han, et al., "A Spectrum Exchange Mechanism in Cognitive Radio Contexts," IEEE 17th International Symposium on Personal, Indoor and Mobile Radio Communications, pp. 1-5, September 2006.

Another method uses a probabilistic approach for collaborative detection under soft and hard information combining strategies, Visotsky et al., "On Collaborative Detection of TV Transmissions in Support of Dynamic Spectrum Sharing," First IEEE International Symposium on New Frontiers in Dynamic Spectrum Access Networks (DySPAN), pp. 338-345, November 2005.

None of the above methods consider the joint problem of detection and signaling to determine the overhead associated with spectrum exchange mechanism.

One method describes an analytical model of CR MAC with two types of channel sensing, Su et al., "Cognitive Radio Based Multi-Channel MAC Protocols for Wireless Ad Hoc Networks," IEEE Global Telecommunications Conference (GLOBECOM), pp. 4857-4861, November 2007. However, that MAC mechanism requires exact synchronization a small time scale.

Several methods minimize the interference with or by PNs by using the DCC, Azarnasab et al., "Filterbank Multicarrier and Multicarrier CDMA for Cognitive Radio Systems," IEEE CrownCom, August 2007, Cabric et al., "Implementation Issues in Spectrum Sensing for Cognitive Radios," Conference Record of the Thirty-Eighth Asilomar Conference on Signals, Systems and Computers, vol. 1, pp. 772-776, November 2004, Mishra et al., "Cooperative Sensing Among Cognitive Radios," IEEE International Conference on Communications (ICC), vol. 4, pp. 1658-1663, June 2006, and Cabric et al., "A Cognitive Radio Approach for Usage of Virtual Unlicensed Spectrum," 14th IST Mobile and Wireless Communications Summit, June 2005.

SUMMARY OF THE INVENTION

In a cognitive radio (CR) network, all nodes collaboratively sense and signal a radio frequency (RF) spectrum to improve the reliability of communications. The hidden node problem is solved using a matrix formulation and numerical evaluation.

DETAILED DESCRIPTION OF THE PREFERRED EMBODIMENT

Cognitive Radio Network

Figure 1A:
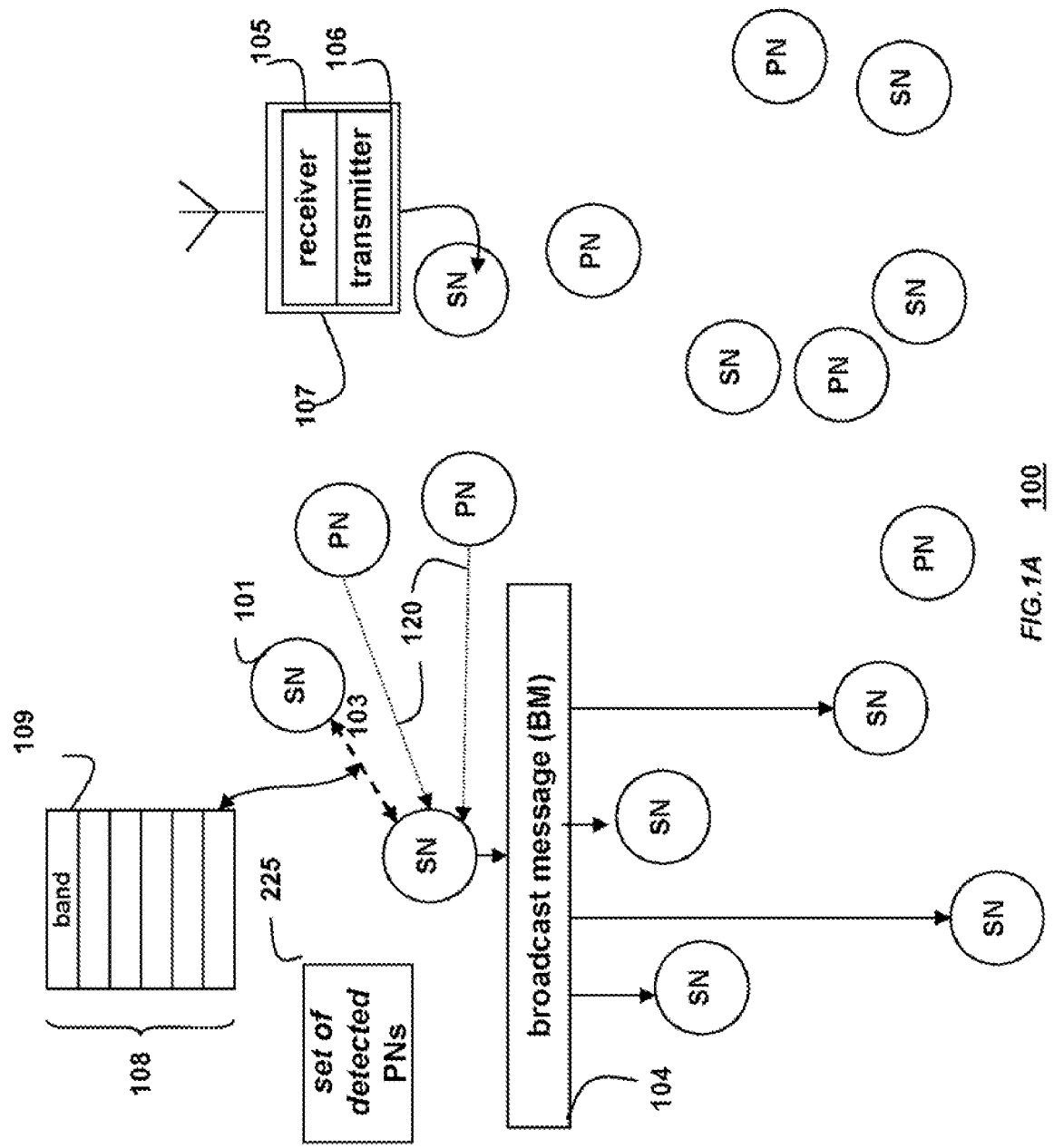
FIG. 1A is a schematic of a cognitive radio network according to embodiments of the invention.

FIG. 1A shows a cognitive radio (CR) network 100 according to embodiments of our invention. The network includes primary nodes (PNs) 101 and secondary nodes (SNs) 102. Each node includes a receiver 105 and a transmitter 106, in combination a transceiver 107 and one or more antennas that can be used for transmitting or receiving. A wide band radio frequency (RF) spectrum 108 is partitioned into narrow bands 109. The nodes transmit and receive on the bands. As used herein, bands and channels 103 interchangeable, i.e., each channel uses a dedicated narrow band of frequencies.

Three-Phase Cognitive Cycle

Figure 1B:
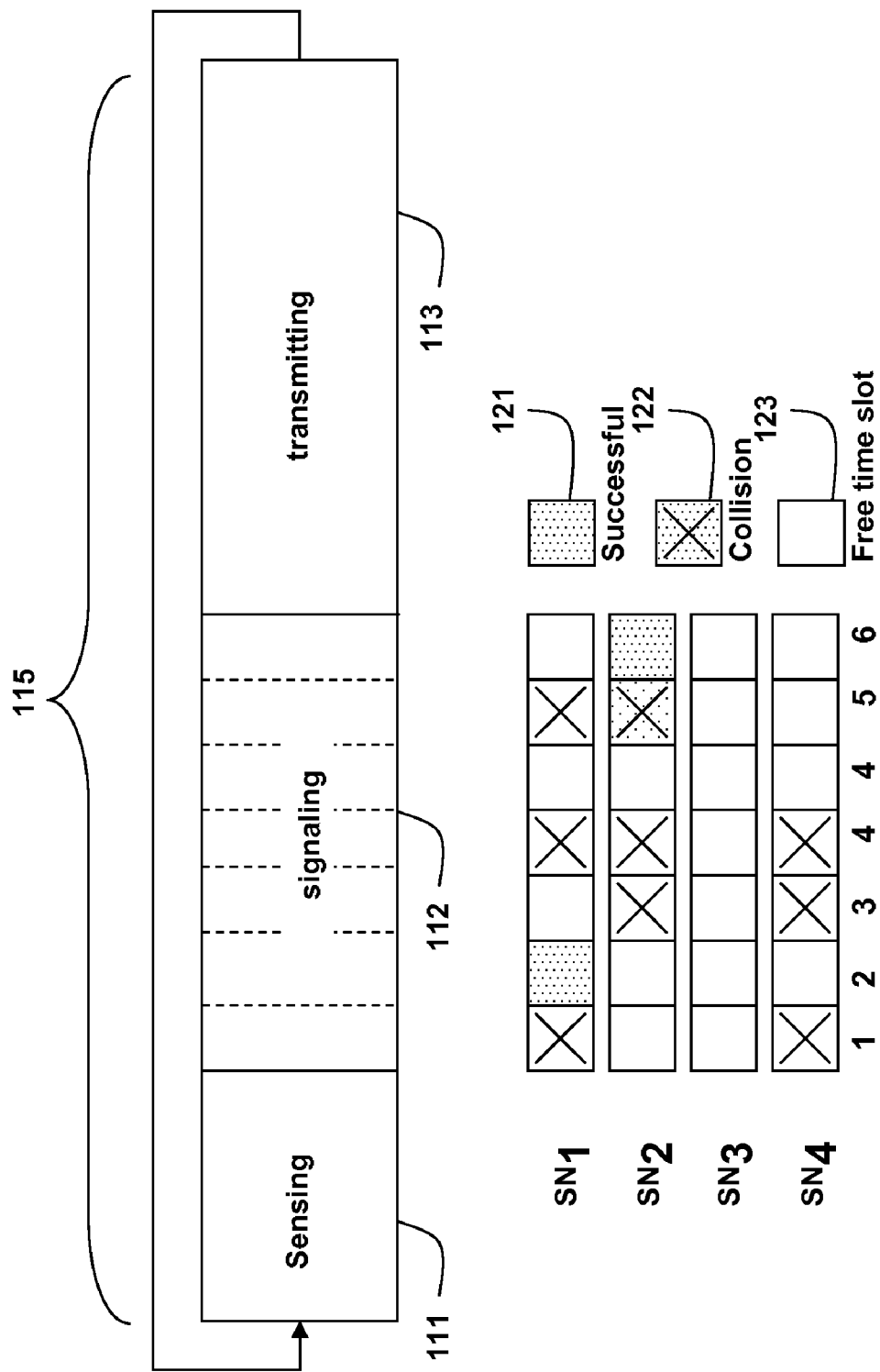
FIG. 1B is block diagrams of a three phase cognitive cycle and underlying signaling protocol according to embodiments of the invention.

FIG. 1B shows a three-phase cognitive cycle 115 including a sensing period 111, a collaborative signaling 112 period, and a transmitting period 113. Duration of the cycle and the sensing period of a wide band spectrum are predetermined for the network. It is desired to minimize the duration of the signaling period so that the duration of the transmitting period is maximized to reduce overhead and increase network efficiency.

During the sensing period, each SN senses primary node transmissions 120 on the set of bands or channel, e.g., using a filterbank or other detection techniques. The sensing is used to form a set of detected PNs at each SN.

During the signaling period, the SNs that have sensed PN transmissions on any of the set of bands transmit a broadcast message (BMs) 104. The MB includes the set of PNs. The BMs are transmitted randomly in synchronized time slots, i.e., using a random channel access technique, e.h., ALOHA or carrier sense multiple access (CSMA), thus collsions can occur. The signaling of the set of detected PNs by each SN takes one time slot. The other time slots are used to receive the sets of the PNs signaled by other SNs.

During the transmission period, the SN transmit data on the bands that are disjoint from the bands used by the PNs.

For simplicity of this description, we assume a single hop network where any broadcast is received by all other nodes. For a BM to be successful, only one SN needs to broadcast.

As shown in FIG. 1B, $SN_1$ and $SN_2$ have successful BMs 121 in the second and last sixth slots, respectively. $SN_3$ does not detect any PN, and assumes all time slots are free 123. $SN_4$ detects three collisions 122.

The interference requirements of the network imposes restriction on the length of the cognitive cycle. We assume a fixed length cognitive cycle. To maximize the bandwidth efficiency of the SN network, the duration of the signaling period is minimized. The sensing period depends on a size of the sensed wide band spectrum 108 and the number of bands 109 or channels 103 in the band. For a given network these are predetermined. Therefore, the duration of the sensing period is fixed. To maximize the bandwidth efficiency of the network, it is important to design an efficient multiple access control (MAC) protocol that minimizes the signaling time and overhead.

Problem Definition

Given the MAC protocol, we minimize a length of the signaling period subject to the constraint that each SN achieves a high detection probability at the end of the signaling period. We assume that the signaling period is time-slotted, and each BM is transmitted during one time slot.

During each time slot, the SN can either broadcast the BM 104 or receive on the channel 103. After the sensing period, each SN has detected each active PN band with probability q, independently of other SNs and other PN bands.

If there are M active PN bands, for an SN network of N nodes, then a probability that an arbitrary SN detects all the M PNs by the end of time slot n is $P_D(n, N, M)$, and $P_D(0, N, M)=q^M$ a local detection probability after the sensing period at a particular SN.

Because some SN are likely to receive the BMs from other SNs as n increases, the probability $P_D(n, N, M)$ is a non-decreasing function of n, which improves the detection probability. To minimize a length of the signaling period, while maintaining a certain detection probability, we determine a smallest number of time slots n such that the probability $P_D(n, N, M) \geq \gamma$, where $0 < \gamma < 1$ is predetermined.

MAC Protocol: τ-Persistent Slotted ALOHA on the DCC

Each SN transmits the BMs on a dedicated control channel (DCC) with probability of τ. The DCC can be preallocated or allocated dynamicall as a cognitive DCC. In this case, the quality-of-service (QOS) is measured on each of the bands.

Instead of transmitting the binary decision vector representing detection of the PNs on each band, the SNs transmit the QOS measurements to collaboratively determine the QOS of channels. The channel with the best collaborative QOS is selected for the DCC. The DCC while it retains the necessary QOS.

Upon detection of interference on the cognitive DCC, nodes switch to a previously determined DCC channel. At any time, the SNs tracks the best K channels, and switch to the next best channel when the previous DCC becomes unusable.

To facilitate the discovery of the control channel for a SN nodes joining the network, or when all K channels become unusable, specialized SNs transmit periodic beacons, as in networks designed according to the IEEE 802.11b standard. These beacons, as well as all other control channel traffic, use a unique packet header in their control messages.

Keeping track of a large number of channels requires more signaling overhead per packet. Thus, the number of channels is set according to a reliability requirement of the network. A large K keeps data communication active in presence of speradic interference. Because data communication is only feasible after DCC is determined and detecting beacons can be slow, a good choice of K can increase the throuput of the network.

Single-Band Signaling Protocol

Single-band signaling refers to the case where there is only one active PN band, i.e., M=1, i.e., we evaluate $P_D(n, N)=P_D(n, N, 1)$ as described below. Each SN can transmit BMs on the DCC with random probability of τ in successive time slots, unless the SN receives a successful BM. In this way, most of the SN stop transmitting early in the signaling period, without using an acknowledgment (ACK) mechanism. In any case, signaling can stop after n time slots.

Assuming a detection probability q, we determine τ that maximizes the probability of detecting the PNs in a network of N SNs after n time slots.

Generally, contention based carrier sense multiple access (CSMA) MAC layers, with backoff, have a simple random access behavior in their steady state regimes. This behavior is analogous to τ-persistent slotted ALOHA in which the nodes broadcast with constant probability of τ in each slot. The probability τ can be determined based on traffic intensity and selected network parameters.

Therefore, our protocol is applicable to the more sophisticated protocols such as IEEE802.11 CSMA with backoff. Thus, our method uses the results of a simpler protocol for more complicated MAC protocols.

We evaluate the probability $$P_D(n, N) = \qquad (1)$$

$$q + (1-q) \sum_{i=1}^{n} \sum_{d=1}^{N-1} \binom{N-1}{d} q^d (1-q)^{N-d-1} \times d \times \tau (1-\tau)^{d-1}$$

$$(1 - d \times \tau (1-\tau)^{d-1})^{i-1},$$

wherein d is the number of SNs.

To minimize the time for evaluating Equation (1), for each τ, we determine the smallest number of time slots $n_{opt}(\tau)$ for which $P_D(n_{opt}(\tau), N) \geq \gamma$. This gives us $n_{opt}(\tau)$, which can then be used to find the optimum value of τ that minimizes n.

Optimum parameters, such as initial backoff window size, for any CSMA/CA protocol, can then be found using the analysis of Anouar et al., "Optimal Constant-Window Backoff Scheme for IEEE 802.11 DCF in Finite Load Single-Hop Wireless Networks," pp. 277-281, 2006.

Multiband Signaling Protocol Extension

In a general multiband case, which includes the singleband case, there are M active PNs to be detected. Complete detection of all M bands with probability of γ is desired. The BMs in multiband signaling are thus a binary vector of size M.

Each SN tries to signal all detected PNS to other nodes in the network. Each SN transmit BMs on the DCC with a probability of τ in successive time slots, unless the SN receives one or more successful BM that cumulatively report the same M PNs as detected by the SN. If more data are reported in the multiband protocol, then the DCC should have a larger bandwidth.

Figure 2:
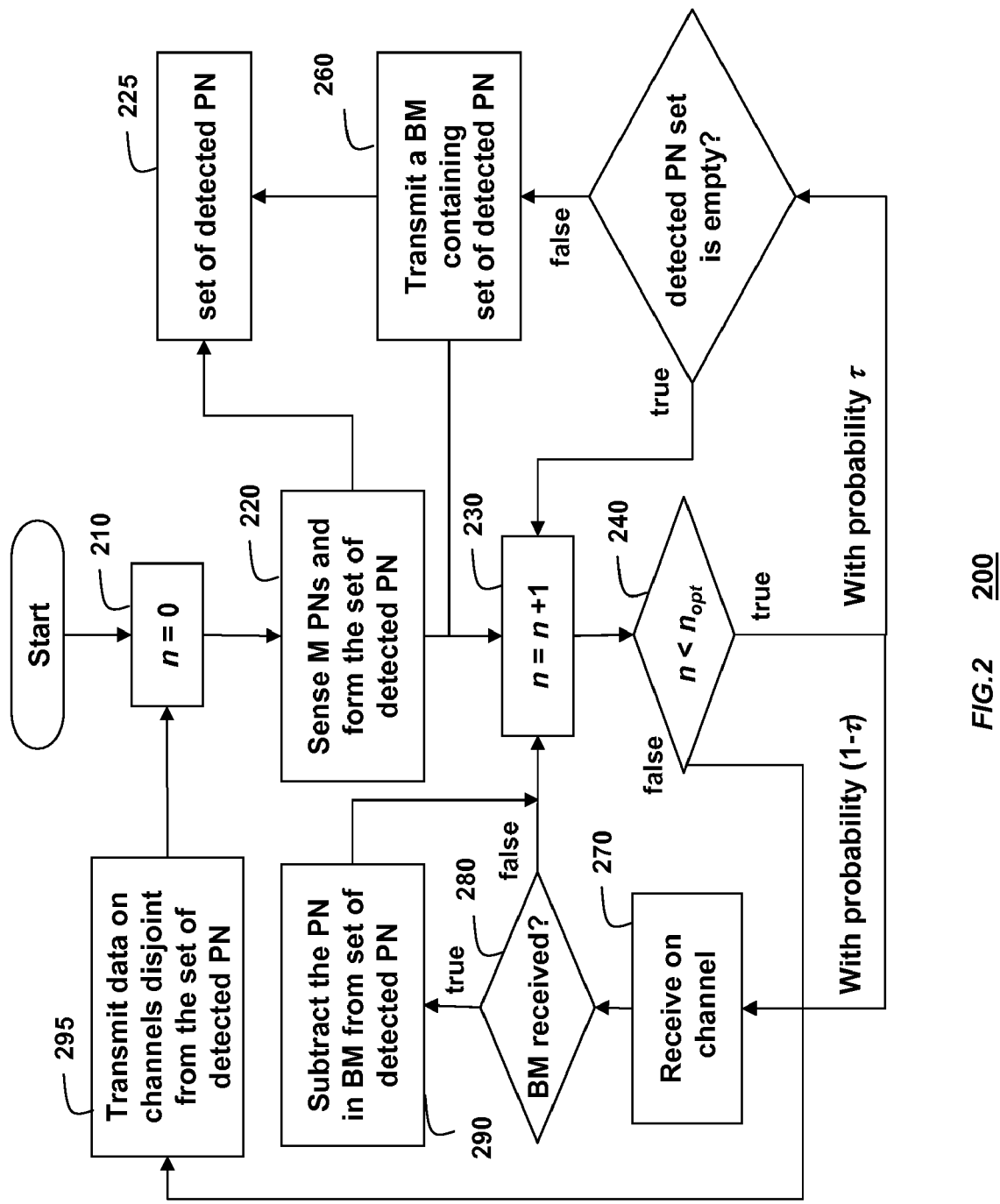
FIG. 2 is a block diagram of a method for detecting hidden nodes in the network of FIG. 1A using the cognitive cycles of FIG. 1B according to embodiments of the invention.

FIG. 2 shows the signaling protocol as describe herein starting 210 with setting n=0. A detected PN is 225 formed set by sensing 220 M PNs during the sensing period 111. Increment 230 n. Determine 240 if n<$n_{opt}$.

If n<$n_{opt}$ is true with probability τ, then determine 250 if the detected PN set is empty, and if true continue with step 230, otherwise, if the PN is not empty, transmit 260 the BM containing the PN set.

If n<$n_{opt}$ is true with probability 1-τ, receive 270 on a channel, and determine if the BM is transmitted during the signaling period, and if false, continue with step 230, and otherwise if true, the PN indicated in the BM is subtracted 290 from the set of detected PN and continue with strep 230.

If false n<$n_{opt}$ is false, then transmit 295 on channels disjoint of those used by the detected PN.

An extension of the above analytical results to the case of multiband is performed after a matrix formulation of the problem that leads to an in-depth understanding of the protocol. The matrix formulation is also a recursive solution and enables us to determine the desired probabilities numerically through a simple procedure. A simpler approximation for the multi band formulation is also formulated.

In a multiband collaborative sensing, all the SNs must detect all of the M PNs. Each node broadcasts the set of detected PNs 225 with probability τ in each BM time slot, i.e., τ-persistent slotted ALOHA, until receiving one or more BM including a larger number of PN than in its local set 225.

This is different from the case of single-band (M-1), where detection is fulfilled when one BM has been received. In the multiband case, multiple BMs may be necessary to complete a collaborative detection.

The multiband analysis also takes into account different distribution probabilities assigned to different users. This allows to model a realistic network in which detection probability of nodes depend on factors such as their location and receivers.

Effect of the Invention

The embodiments of the invention provide a MAC protocol for collaborative detecting hidden nodes in a cognitive radio networks. For a single-band channel, we derived a closed form solution for the probability of detecting primary nodes.

Using this solution, the effect of local detection probability and SN network size are analyzed to determine the number of time slots required to achieves a desired detection probability that minimizes the signaling overhead and increases bandwidth efficiency.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting hidden nodes in a cognitive radio network including a set of primary nodes (PNs) and a set of secondary nodes (SNs) using a wide band frequency spectrum partitioned into a set of bands, comprising:
    partitioning time into cognitive cycles including a sensing period, a signaling period and a transmission period, and for each cycle further comprising the steps of:
    sensing, in each SN during the sensing period, primary nodes transmissions on the set of bands;
    forming, in each SN node, a set of detected PNs based on the sensing;
    signaling, by each SN during the signaling period, the set of detected PNs; and
    transmitting, by the SN during the transmission period, data on the bands that are disjoint of the bands used by the set of detected PNs, wherein a probability of sensing all PNs transmitting during the sensing period is between 0 and 1 for each SN, and wherein the probability is $$P_D(n, N) = q + (1-q) \sum_{i=1}^{n} \sum_{d=1}^{N-1} \binom{N-1}{d}$$

$$q^d (1-q)^{N-d-1} \times d \times \tau(1-\tau)^{d-1} (1 - d \times \tau(1-\tau)^{d-1})^{i-1},$$

where n is a number of the time slots, N is a number of PNs, q a probability of sensing all the PNs by a particular SN, and d is a number of SNs, τ is a probability of transmission by the SN.

2. The method of claim 1, wherein durations of the cycle and the sensing period are predetermined.

3. The method of claim 1, further comprising:
    minimizing a duration of the signaling period to maximize a duration of the transmitting period.

4. The method of claim 1, wherein the sensing uses a filter bank.

5. The method of claim 1, wherein the signaling period is partitioned into a set of synchronized time slots, and wherein the signaling by each SN during the set of time slots uses a random channel access technique; and each SN uses one time slot to signal the set of detected PNs, and uses the other time slots in the set of time slots to receive the sets of detected PNs signaled by other SNs.

6. The method of claim 5, further comprising:
    minimizing a number of the time slots n is minimized for the network of N nodes and M bands.

7. The method of claim 1, wherein the signaling is on a dedicated control channel (DCC).

8. The method of claim 7, wherein the DCC is predetermined.

9. The method of claim 7, wherein the DCC is determined dynamically based on a quality-of-Service measure.

10. The method of claim 1, wherein the set of detected PNs is not an empty set.

* * * * *